United States Patent
Nagaoka et al.

(10) Patent No.: US 7,669,410 B2
(45) Date of Patent: Mar. 2, 2010

(54) SULFUR PURGE CONTROL METHOD FOR EXHAUST GAS PURIFYING SYSTEM AND EXHAUST GAS PURIFYING SYSTEM

(75) Inventors: Daiji Nagaoka, Fujisawa (JP); Masashi Gabe, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 279 days.

(21) Appl. No.: 11/667,242

(22) PCT Filed: Nov. 10, 2005

(86) PCT No.: PCT/JP2005/020578

§ 371 (c)(1),
(2), (4) Date: May 8, 2007

(87) PCT Pub. No.: WO2006/059470

PCT Pub. Date: Jun. 8, 2006

(65) Prior Publication Data

US 2009/0077947 A1 Mar. 26, 2009

(30) Foreign Application Priority Data

Nov. 30, 2004 (JP) .............................. 2004-345788
Dec. 7, 2004 (JP) .............................. 2004-353780

(51) Int. Cl.
*F01N 3/00* (2006.01)

(52) U.S. Cl. .............................. 60/286; 60/274; 60/277; 60/285; 60/295; 60/297

(58) Field of Classification Search .................. 60/274, 60/276, 277, 284, 285, 286, 295, 297, 300
See application file for complete search history.

(56) References Cited

U.S. PATENT DOCUMENTS 5,722,236 A * 3/1998 Cullen et al. .................. 60/274

(Continued)

FOREIGN PATENT DOCUMENTS

JP 2000-153132 6/2000

(Continued)

OTHER PUBLICATIONS

International Search Report for PCT/JP2005/020578, mailed Feb. 21, 2006.

(Continued)

*Primary Examiner*—Binh Q Tran
(74) *Attorney, Agent, or Firm*—Staas & Halsey LLP

(57) ABSTRACT

In an exhaust gas purifying system which is equipped with an NOx occlusion reduction type catalyst ("NOx catalyst") and an oxidation catalyst set on the upstream side of the NOx catalyst, and in which sulfur purge control for regenerating the sulfur-poisoned catalyst is conducted, an air fuel ratio control for sulfur purge is conducted when a temperature difference between an inlet side and an outlet side of the NOx catalyst is outside a given range. Sulfur poison on the NOx catalyst can be uniformly removed in sulfur-purge regeneration control, thereby extending the service life of the NOx catalyst. Further, the NOx catalyst can be protected from thermal deterioration caused by partial temperature rise inside the NOx catalyst on its downstream side, so that the service life of the NOx catalyst can also be extended.

12 Claims, 12 Drawing Sheets

U.S. PATENT DOCUMENTS

| | | | |
|---|---|---|---|
| 5,778,666 A * | 7/1998 | Cullen et al. | 60/274 |
| 6,167,696 B1 * | 1/2001 | Maaseidvaag et al. | 60/274 |
| 6,691,507 B1 * | 2/2004 | Meyer et al. | 60/285 |
| 6,779,339 B1 * | 8/2004 | Laroo et al. | 60/297 |
| 6,988,361 B2 * | 1/2006 | van Nieuwstadt et al. | 60/295 |

FOREIGN PATENT DOCUMENTS

| | | |
|---|---|---|
| JP | 2000-170525 | 6/2000 |
| JP | 2001-70754 | 3/2001 |
| JP | 2002-161781 | 6/2002 |
| JP | 2003-500594 | 1/2003 |
| JP | 2003-307124 | 10/2003 |
| JP | 2003-328726 | 11/2003 |
| JP | 2003-336518 | 11/2003 |
| JP | 2004-44515 | 2/2004 |
| JP | 2004-92445 | 3/2004 |
| JP | 2004-218520 | 8/2004 |

OTHER PUBLICATIONS

Patent Abstracts of Japan, Publication No. 2003-336518, Published Nov. 28, 2003.

Patent Abstracts of Japan, Publication No. 2004-092445, Published Mar. 25, 2004.

Patent Abstracts of Japan, Publication No. 2000-170525, Published Jun. 20, 2000.

Japanese Office Action mailed Mar. 7, 2006 in corresponding Japanese Application No. 2004-353780.

Patent Abstracts of Japan, Publication No. 2004-218520, published Aug. 5, 2004.

* cited by examiner

SULFUR PURGE CONTROL METHOD FOR EXHAUST GAS PURIFYING SYSTEM AND EXHAUST GAS PURIFYING SYSTEM

FIELD OF THE INVENTION

The present invention relates to an exhaust gas purification system provided with a NOx occlusion reduction type catalyst for reducing and purifying NOx (nitrogen oxides) in exhaust gas of an interval combustion engine, and to a sulfur purge control method of the same.

DESCRIPTION OF THE RELATED ART

NOx catalysts for reducing and removing NOx from exhaust gas of various combustion devices such as internal combustion engines of diesel engines, some gasoline engines, are researched and proposed. One of them is a NOx occlusion reduction type catalyst as a NOx lowering catalyst for diesel engines. This catalyst can effectively purify NOx in exhaust gas by use of the NOx occlusion reduction type catalyst.

For example, the NOx occlusion reduction type catalyst has the following catalyst reaction function as shown in Japanese Patent Application Kokai Publication No. 1998-30430. The catalyst makes a $NO_x$ metal such as barium (Ba) having the property of occluding NOx, occlude $NO_2$ after oxidizing NO (nitric oxide) into $NO_2$ (nitrogen dioxide) in the case of an air-fuel ratio in a lean-state. Then, a NOx regeneration control for realizing a rich-state of an air-fuel ratio is executed, thereby the $NO_2$ is inversely released from the occlusion material and the $NO_2$ is purified through ternary function by using a HC (hydrocarbon), CO (carbon monoxide).

This NOx occlusion reduction type catalyst is a catalyst of a type mainly carrying precious metals for facilitating an oxidation-reduction reaction and NOx occlusion material (NOx occlusion substance) having the function of occluding and releasing NOx on a catalyst carrier such as alumina. The precious metal is platinum (Pt) or palladium (Pd), etc. The NOx occlusion material is alkali earth metal such as barium (Ba).

In the case where the air fuel ratio of the exhaust gas flowing in is lean and oxygen ($O_2$) exists in the atmosphere, the NOx occlusion reduction type catalyst oxidizes nitric oxide (NO) in the exhaust gas by precious metals into nitrogen dioxide ($NO_2$), and the oxidized $NO_2$ is accumulated in the NOx occlusion material as a nitrate salt ($Ba_2NO_4$ etc.).

Moreover, in the case where the air fuel ratio of the exhaust gas flowing in is a stoichiometric air fuel ratio or in a rich state (low oxide concentration) and oxygen is not present in the atmosphere, the NOx occlusion material such as barium (Ba) is connected to carbon monoxide (CO) and nitrogen dioxide ($NO_2$) is resolved and released from the nitrate salt. This released nitrogen dioxide ($NO_2$) is reduced by unburned hydrocarbon (HC) or carbon monoxide (CO) etc contained in the exhaust gas through a three-way function of the precious metal group and becomes a nitride ($N_2$). Thereby, the various components contained in the exhaust gas are released into the atmosphere as harmless substances such as carbon dioxide ($CO_2$), water ($H_2O$), nitride (N2).

Therefore, the exhaust gas purification system with the NOx occlusion reduction type catalyst executes a NOx regenerating operation which performs a rich control of the air fuel ratio for regenerating the NOx occlusion ability when its NOx occlusion ability approaches saturation. Thus, the absorbed NOx is released and the released NOx is reduced through a precious metal catalyst.

However, there is the problem that its performance is deteriorated by sulfur poisoning of this NOx occlusion reduction type catalyst. That is, sulfur contained in fuel becomes sulfur dioxide ($SO_2$) through burning, is occluded in the occlusion material in the same manner as nitrogen dioxide ($NO_2$), and generates a sulfate such as barium sulfate ($Ba_2SO_4$). Thereby, the occlusion ability of nitrogen dioxide ($NO_2$) decreases.

Therefore, in order to maintain the initial catalyst purifying performance, adding to recover the NOx occlusion ability by NOx regeneration control, it is necessary to separate sulfur absorbed and occluded in catalyst and to cause it to be released. This separation and release of sulfur requires a higher temperature than a certain temperature and a reduction atmosphere in the exhaust gas content. Thus, an environment that facilitates the resolution of the sulfate is required by performing sulfur purge control for an atmosphere of a rich state of an air fuel ratio.

For example, as disclosed in Japanese Patent Application Kokai Publication No. 2003-500594, Japanese Patent Application Kokai Publication No. 2003-336518, Japanese Patent Application Kokai Publication No. 2004-92445, sulfate is not resolved and is not released, if a rich condition at a high temperature of about 600° C. to 700° C. is not attained. Moreover, for oxide concentration, since a reducing agent such as a hydrocarbon (HC) or carbon monoxide (CO) uses an oxide ($O_2$) for oxidization, resolution of the sulfate ($Ba_2 SO_4$ etc.) is not facilitated and sulfur purge is not caused.

In conventional technology, a method for raising the exhaust gas temperature to a sulfur resolution temperature (sulfur purgeable temperature) includes a post injection method with fuel injection inside a cylinder and a direct fuel addition method in an exhaust pipe. Further, on the engine side, heat capacity of the exhaust gas is lowered through decreasing the flow-volume of the exhaust gas by an intake throttle etc.

However, in this sulfur purge control, there is the problem of evenness of temperature in the catalyst and the problem of generation of hydrogen sulfide.

The problem of evenness of temperature in the catalyst will be described referring to FIG. 13 and FIG. 14. FIG. 13 shows a temperature distribution in a catalyst, and FIG. 14 shows a time series of catalyst temperatures. In FIG. 14, S shows the amount of sulfur purge, and λ shows the air excess rate. Also, Tf, Tm, and Ta show catalyst temperatures on the upstream side, midstream side and downstream side of the NOx occlusion reduction type catalyst respectively.

The conventional technological method for raising the temperature cannot make the temperature distribution inside a catalyst uniform in a rich process of taking a reduction atmosphere of exhaust gas content after raising the temperature of the catalyst as shown in FIG. 13 and FIG. 14. That is, the temperature of the upstream area F in the catalyst cannot be raised higher than the sulfur resolution temperature Tsd, and the temperature Tf enters a low temperature area less than the sulfur resolution temperature Tsd. On the other hand, the midstream area M and the downstream area A in the catalyst only become higher than the sulfur resolution temperature Tsd.

Therefore, even if the sulfur purge operation is performed, since sulfur in the upstream area F in the catalyst having the temperature lower than the sulfur resolution temperature Tsd is insufficient for its separation and release, catalyst performance is not recovered. Besides, since catalyst activation is low, oxidation consumption of the catalyst surface and the inside of an occlusion agent becomes insufficient and the reduction atmosphere on the catalyst surface is insufficient.

Thus, the sulfur separation effect is extremely lowered and recovery of catalyst performance becomes impossible.

Furthermore, the temperature of the midstream area M of the catalyst is higher than the sulfur separation resolution temperature Tsd and lower than the catalyst thermal deterioration temperature Tcd. Since sulfur separation is effectively performed under a rich state of an air fuel ratio, the catalyst is recovered from sulfur poisoning.

However, in the downstream area A of the catalyst, its temperature Ta also rises and becomes an abnormally extreme temperature above the catalyst thermal deterioration temperature Tcd. Thereby, the catalyst causes extreme thermal deterioration and its durability is extremely lowered.

On the other hand, if the catalyst temperature Tc is raised up to the sulfur resolution temperature Tsd in the upstream area F in the catalyst, the abnormally high temperature area where the temperature in the catalyst is higher than the catalyst thermal deterioration Tcd extends due to the evenness of temperature distribution in the catalyst. As a result, the problem of extreme thermal deterioration and the problem of the enlargement of the area in which the durability of catalyst is extremely lowered, occur.

Next, the problem of generation of hydrogen sulfide will be described below referring to FIG. 9. FIG. 9 is a view illustrating a time series of a sulfur purge control and shows a continuous rich control according to conventional technology on its left side.

If an oxide ($O_2$) is not present upon sulfur purge control, sulfur connects with hydrogen ($H_2$) and generates and emits the harmful gas of hydrogen sulfide ($H_2S$). Therefore, it is necessary to re-oxidize hydrogen sulfide ($H_2S$) and to release sulfur as sulfur dioxide ($SO_2$). Also, since heat generation depending on the oxidation reaction is small, the catalyst temperature lowers during sulfur purge. Thus, the atmospheric condition that includes a small amount of oxygen ($O_2$) necessary to oxidize hydrogen sulfide ($H_2S$) is required.

If the air fuel ratio of the inlet side of the catalyst is maintained in a rich state in which air fuel ratio is larger than theoretical air fuel ratio, the released sulfur dioxide ($SO_2$) and hydrocarbon (HC) of the reducing agent react due to insufficient oxygen and the generation rate of the noxious smelling hydrogen sulfide ($H_2S$) is higher.

On the other hand, in the case where the oxygen concentration on the catalyst outlet side is maintained in a stoichiometric state, hydrogen sulfide ($H_2S$) can be lowered as shown at the right end A of FIG. 9. However, the amount of sulfur purge is equal to ⅕ or less. Thereby, sulfur purge control time for purging sulfur becomes longer. In this sulfur purge, the catalyst temperature is set to a high temperature of about 700° C. If sulfur purge control time becomes longer, problems such as high costs and catalyst deterioration are caused.

Furthermore, regarding sulfur purge control for sulfur poisoning regeneration (recovery) of a NOx catalyst, for example, in Japanese Patent Application Kokai publication No. 2000-170525, a exhaust gas purifying device of an internal combustion engine is proposed as follows. For effective improvement of SOx release from an SOx absorption agent (NOx absorption agent), the air fuel ratio of the exhaust gas flowing in the SOx absorption agent is controlled so that the air fuel ratio of the exhaust gas at the outlet of the SOx absorption agent is in a stoichiometric air fuel ratio (stoichiometric). In this air fuel ratio control, at first the air fuel ratio of the exhaust gas flowing in SOx absorption agent is controlled in a rich state and then the air fuel ratio of the exhaust gas flowing in is controlled to approach the stoichiometric air fuel ratio.

However, in this exhaust gas purifying device of an internal combustion engine in the case where the excess air rate λ of the catalyst inlet side is maintained in a rich state not more than 1.0 so that the air fuel ratio of the exhaust gas at the outlet of the SOx absorption agent becomes a stoichiometric air fuel ratio (stoichiometric), oxygen is not sufficient. Therefore, the released sulfur dioxide ($SO_2$) and hydrocarbon (HC) of the reducing agent react with each other, and hydrogen sulfide ($H_2S$) is generated.

Moreover, for example, Japanese Patent Application Kokai Publication No. 2003-336518 (page 5) proposes the following exhaust gas purifying device of an internal combustion engine. In order to check the excess rich value of the air fuel ratio upon sulfur purge control, an electric control unit (ECU) executes fuel addition control (so called rich spike control) so that oxygen concentration in the exhaust gas flowing into a filter is lowered in a spike manner in a relatively short period in recovering the SOx-poison.

However, this exhaust gas purifying device does not show a response of changing to hydrogen sulfide ($H_2S$) from sulfur dioxide ($SO_2$) because of insufficient oxygen. Also, for application, specific values of a rich and lean air fuel ratio, rich duration period, and lean duration period are required, but these specific combinations are not described.

SUMMARY OF THE INVENTION

The present invention is developed to resolve the above problems. In a exhaust gas purification system using a NOx occlusion reduction type catalyst for purifying NOx in exhaust gas, it is the objective of the present invention to uniformly remove sulfur poisoning of a NOx occlusion reduction type catalyst by uniformly maintaining a temperature of the NOx occlusion reduction type catalyst to that not less than the sulfur resolution temperature and performing air fuel ratio control for sulfur purge during sulfur purge regeneration control for sulfur poisoning regeneration. Thereby, the durational period of the deterioration of a catalyst caused by sulfur poisoning is avoided and also its thermal deterioration is prevented in the downstream area in the catalyst from being at a high temperature. Accordingly, it is its objective to provide an exhaust gas purification system and a sulfur purge control method of the same.

Furthermore, in the exhaust gas purification system using the NOx occlusion reduction type catalyst for purifying NOx in exhaust gas, it is a further objective to provide an exhaust gas purification system and a sulfur purge control method of the same capable of maintaining a catalyst temperature during sulfur purging and also capable of increasing the rate of sulfur dioxide ($SO_2$) by restricting the generation amount of hydrogen sulfide ($H_2S$) during sulfur purge regeneration control.

A sulfur purge control method of an exhaust gas purification system for attaining the above objectives is provided with a NOx occlusion reduction type catalyst for occluding NOx in the case where the air fuel ratio of the exhaust gas is lean, and releasing the occluded NOx to reduce it in the case where the air fuel ratio of the exhaust gas is rich, and an oxidation catalyst in the upstream side of the NOx occlusion reduction type catalyst. The method is for executing a sulfur purge control for deterioration recovery caused by sulfur poisoning of the NOx occlusion reduction type catalyst, and the sulfur purge control is executed after the temperature difference between the inlet side and the outlet side of the NOx occlusion reduction type catalyst is in a temperature value not more than a given temperature value by raising the exhaust temperature.

Moreover, the air fuel ratio state of the exhaust gas described in the above does not always mean an air fuel ratio state in a cylinder, but means a ratio of air amount to fuel amount supplied in the exhaust gas flowing in the NOx occlusion reduction type catalyst (including the burned amount in the cylinder).

Also, the oxidation catalyst may be placed on the upstream side of the NOx occlusion reduction type catalyst, and may be a 2 brick type catalyst carrying the oxidation catalyst on the upstream area of the catalyst honeycomb and the NOx occlusion reduction type catalyst on the downstream area of the catalyst honeycomb.

By this structure that the oxidation catalyst is disposed on the pre-stage of the NOx occlusion reduction type catalyst, hydrocarbon (HC) reacts to the oxidized catalyst of the upstream area and the temperature of exhaust gas is raised. Therefore, the exhaust gas has higher temperature than its activation temperature from steps before flowing in the post stage of the NOx occlusion reduction type catalyst. For this reason, the post stage of the NOx occlusion reduction type catalyst is uniformed in the catalyst temperature distribution, the catalyst is uniformly raised in temperature to sulfur resolution temperature in whole.

Furthermore, before entering the air fuel ratio control for sulfur purge, the system is controlled so as to enter the air fuel ratio control for sulfur purge after it is confirmed that the temperature difference of the inlet area and the outlet area of the catalyst is within a given temperature difference, that is, after it is confirmed that the temperature distribution in the NOx occlusion reduction type catalyst is uniform. Thereby, sulfur is separated from the catalyst certainly.

In the above sulfur purge control method of the exhaust gas purification system, the given temperature value is set to a range of 5° C. to 25° C., preferably 5° C. By this, equalization of the catalyst temperature distribution of the NOx occlusion reduction type catalyst can be realized with accuracy, and the sulfur purge is effectively performed.

Also, the control whereby the air fuel ratio on the inlet side of the NOx occlusion reduction type catalyst is set to rich and the control whereby it is set to lean are alternately repeated when executing the air fuel ratio control for sulfur purge.

Furthermore, in the above sulfur purge control method of the exhaust gas purification system, the air fuel ratio control for sulfur purge of a target air fuel ratio of the inlet side is set to 0.85 to 0.95 for an air excess rate conversion on the rich side control and to 1.05 to 1.15 for an air excess rate conversion on the lean side control is performed.

In the sulfur purge control for sulfur poisoning recovery of the NOx occlusion reduction type catalyst (regeneration, sulfur purge), this air fuel ratio control method of the catalyst inlet side periodically repeats a rich state of the air fuel ratio of 0.85 to 0.95, preferably 0.9 for an air excess rate conversion on the inlet side of the NOx occlusion reduction type catalyst, and a lean state of the air fuel ratio of 1.05 to 1.15, preferably 1.1. By this control, the reducing agent for raising the temperature of the exhaust gas can be sufficiently saved and at the same time the oxygen amount for oxidizing hydrogen sulfide ($H_2S$) into sulfur dioxide ($SO_2$) can be provided in the needed amount. Moreover, these specific values have been obtained from experiments.

That is, at first the air fuel ratio of the inlet side of the NOx occlusion reduction type catalyst is temporally set to a lean state of 1.05 to 1.15. By this, raising the temperature of the exhaust gas and the oxygen atmosphere is adequately made and it becomes possible to supply just the appropriate amount of oxygen for converting hydrogen sulfide ($H_2S$) into sulfur dioxide ($SO_2$) by oxidation. Thus, hydrogen sulfide ($H_2S$) is oxidized into sulfur dioxide ($SO_2$). Therefore, it becomes possible to facilitate sulfur purging by sulfur dioxide ($SO_2$) and maintain the temperature during sulfur purge control by heat generated through oxidation. Thereby, since the rate of sulfur dioxide ($SO_2$) is increased through restricting the generated amount of hydrogen sulfide ($H_2S$) and the generated amount of sulfur dioxide ($SO_2$) is saved, the sulfur purge is completed early. Thus, the sulfur purge control is completed in a short time.

Moreover, in the air fuel ratio control for sulfur purge of the above sulfur purge control method in the exhaust gas purification system, the target air fuel ratio of the inlet side is controlled by feedback control so that the air fuel ratio of the outlet side of the above NOx occlusion reduction type catalyst is in a stoichiometric state during the sulfur purge control.

That is, the value of the λ sensor is always controlled to a value not more than the stoichiometric amount in the outlet side (downstream side) of the catalyst, and the air fuel ratio of the inlet side or a target value in an interval between rich and lean is controlled by feedback control so as to maintain a stoichiometric air fuel ratio as a target value when slightly rich. By this, since it is not more than the stoichiometric air fuel ratio at all times after the middle stage of the catalyst, the sulfur purge becomes possible.

Furthermore, in the air fuel ratio control for sulfur purge of the above sulfur purge control method in the exhaust gas purification system, the rate of the control period for rich side control and lean side control is set to 5:2 to 4:3 for rich side control and lean side control respectively. By these controls, the rate of the reducing agent amount appropriate for the sulfur purge and the oxygen amount is adequately made, and sulfur can be efficiently purged while restricting the generation of hydrogen sulfide ($H_2S$). More, these specific values have been obtained from experiments.

An exhaust gas purification system for offering the above objective is provided with a NOx occlusion reduction type catalyst for occluding NOx in the case where the air fuel ratio of the exhaust gas is lean, and releasing the occluded NOx to reduce it in the case where the air fuel ratio of the exhaust gas is rich, an oxidation catalyst disposed in the upstream side of the NOx occlusion reduction type catalyst, and a sulfur purge control means executing a sulfur purge control for recovering the deterioration caused by sulfur poisoning of the NOx occlusion reduction type catalyst. The sulfur purge control means is constituted to execute the air fuel ratio control for sulfur purge when executing the sulfur purge control after a temperature difference between the inlet side and the outlet side reaches a given temperature value or less, by raising exhaust gas temperature.

Furthermore, in the above exhaust gas purification system, the given temperature value is set to a temperature range of 5° C. to 25° C., preferably 5° C. Also, the sulfur purge control means constituted to alternately repeat a rich side control whereby the air fuel ratio of the inlet side of the NOx occlusion reduction type catalyst is rich, and a lean side control where it is lean.

Furthermore, in the above exhaust gas purification system, the sulfur purge control method is constituted to set the target air fuel ratio of the inlet side to 0.85 to 0.95 for an air excess rate conversion in the rich side control, and to 1.05 to 1.15 for an air excess rate conversion in the lean side control.

In the above exhaust gas purification system, sulfur purge control means feedback controls the target air fuel ratio of the inlet side of the above NOx occlusion reduction type catalyst in such a way that the air fuel ratio of the outlet side thereof is in a stoichiometric state during sulfur purge control.

In the air fuel ratio control for sulfur purge of the above exhaust gas purification system, the rate of control time of a rich control and a lean control is set to 5:2 to 4:3 for a rich side control time and a lean side control time respectively.

As mentioned in the above, in the exhaust gas purification system and the sulfur purge control method using the same according to the present invention, the sulfur poisoning of the NOx occlusion reduction type catalyst is uniformly removed by executing the air fuel ratio control for sulfur purge after uniformly raising the temperature of the NOx occlusion reduction type catalyst not lower than the sulfur resolution temperature. By this, the durational period deterioration caused by sulfur poisoning can be avoided and the back side of the catalyst can be prevented from a partial temperature rise during sulfur purge control. Therefore, thermal deterioration caused by partial high temperatures can be prevented, so the durational deterioration can be suppressed by thermal deterioration.

Furthermore, since the air fuel ratio at the inlet side of the NOx occlusion reduction type catalyst is periodically repeated between a rich state of 0.85 to 0.95 and a lean state of 1.05 to 1.15 for an excess air rate conversion and is feedback controlled to be in a stoichiometric state on the downstream of the NOx occlusion reduction type catalyst, a reducing agent necessary for raising the exhaust gas temperature can be certainly saved, and at the same time it is possible to provide an oxygen amount necessary for oxidizing hydrogen sulfide ($H_2S$) into sulfur dioxide ($SO_2$).

That is, oxidation of hydrogen sulfide ($H_2S$) into sulfur dioxide ($SO_2$) can be certainly attained by not maintaining the air fuel ratio of the inlet side of the NOx occlusion reduction type catalyst in rich state, and intermittently repeating a lean state. And at the same time, sulfur purge can be facilitated and a high temperature for sulfur purge can be maintained.

By this, an oxygen atmosphere and exhaust gas temperature are made to be appropriate, the rate of sulfur dioxide ($SO_2$) is higher restraining the generated amount of oxidizing hydrogen sulfide ($H_2S$), and the generated sulfur purge amount can be saved. Therefore, since sulfur purge can be completed early, sulfur purge control can be finished in a short time.

DETAILED DESCRIPTION OF THE INVENTION

A exhaust gas purification system and a sulfur purge control method using the same in an embodiment according to the present invention will be described below referring to drawings below. Here, the air fuel ratio state of the exhaust gas does not mean an air fuel ratio state in a cylinder, but means a ratio of air amount and fuel amount (including burned fuel in a cylinder) supplied to the exhaust gas flowing in a NOx occlusion reduction type catalyst.

Figure 1:
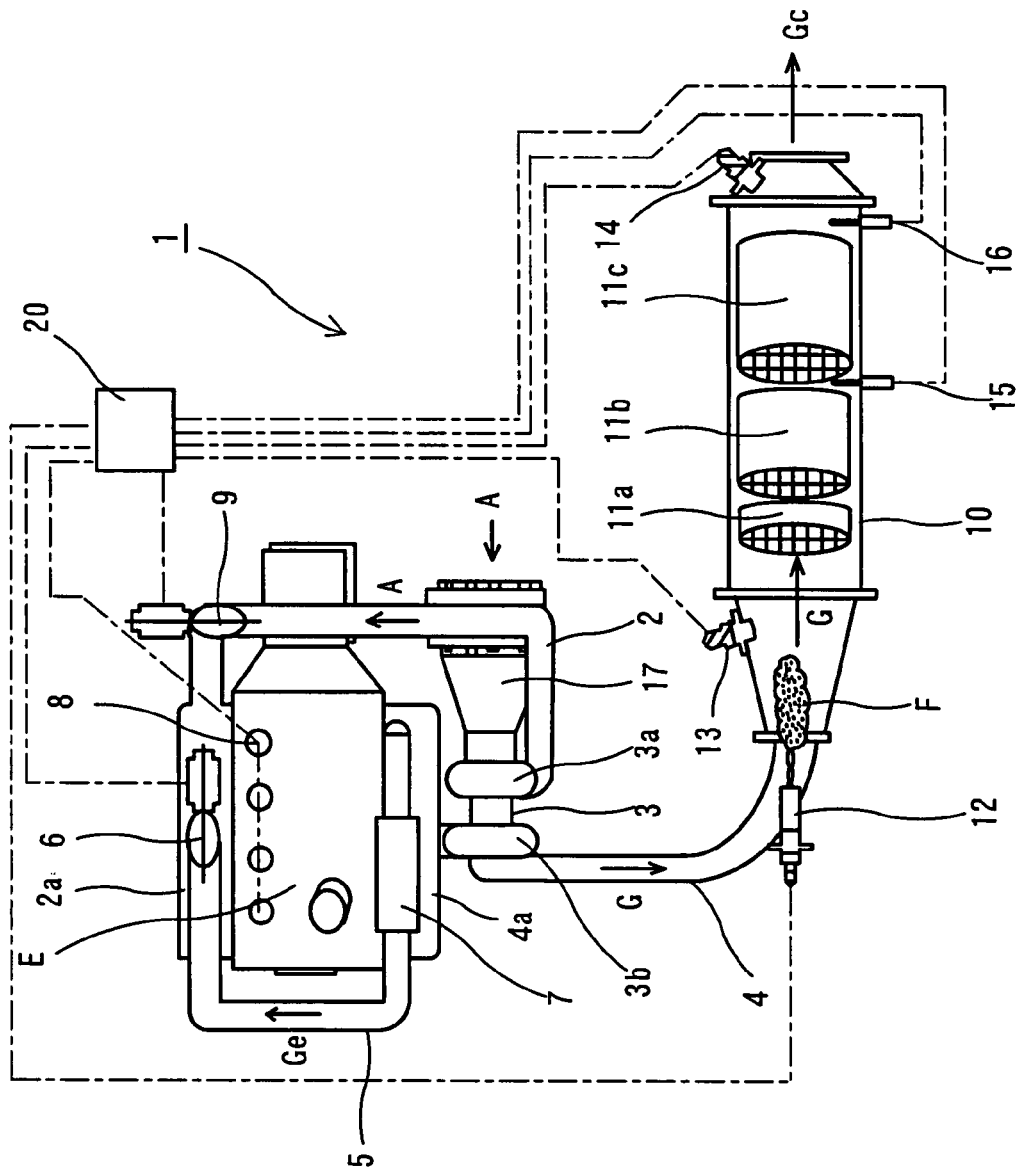
FIG. 1 shows a view illustrating a structure of an exhaust gas purification system in an embodiment according to the present invention.

FIG. 1 shows a structure of an exhaust gas purification system 1 in an embodiment according to the present invention. This exhaust gas purification system 1 is provided with an exhaust gas purification device 10 which has an oxidation catalyst 11a, a DPF 11b and a NOx occlusion reduction type catalyst 11c in an exhaust gas passage 4 of an engine (internal combustion engine) E in order from the upstream side thereof.

The oxidation catalyst 11a is constituted of a monolithic catalyst having a number of polygonal cells made of such structural material as cordierite, silicon carbide (SiC) or stainless steel. These cells have a catalyst coating layer occupying the greater part of the surface of the inner walls of the cells, and the greater surface carries a catalyst metal such as platinum (Pt), vanadium (V) and allows the catalyst to exercise its function.

The DPF 11b may be constituted of a filter of a monolithic honeycomb wall flow type with alternately closed inlets and outlets of channels of a porous ceramic honeycomb. This DPF 11b captures PM (particle matter) in the exhaust gas. The DPF 11b may carry an oxidation catalyst or a PM oxidation catalyst in order to facilitate removing by burning the PM.

The NOx occlusion reduction type catalyst 11c is constituted of a monolithic catalyst. A catalyst coating layer is provided on a carrying body of aluminum oxide, titanium oxide etc. A catalyst metal such as platinum (Pt), palladium (Pd) and NOx occlusion material (NOx occlusion substance) are carried on the catalyst coating layer.

In this NOx occlusion reduction type catalyst 11c, the NOx occlusion material occludes NOx (nitrogen oxides) in the exhaust gas when the exhaust gas state has an oxygen concentration that is high (lean air fuel ratio state). Thereby, the NOx in exhaust gas is purified. Also, the occluded NOx is released and at the same time the released NOx is reduced by the catalyst function of the catalyst metal in an exhaust gas state where the oxygen concentration is low or zero. This prevents the NOx from being released to the atmosphere.

Figure 12:
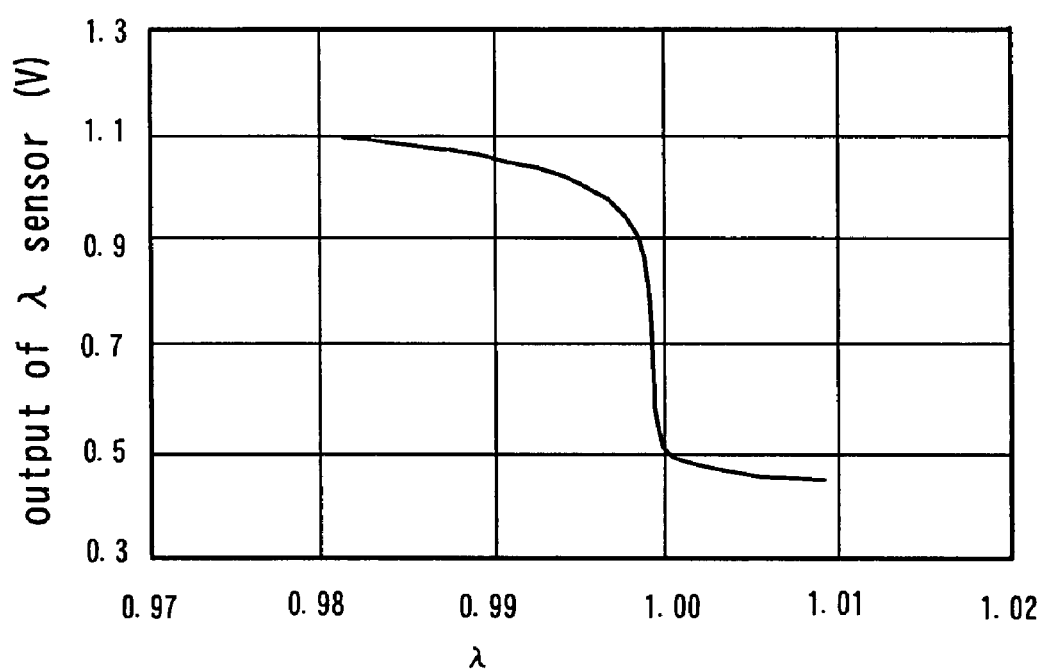
FIG. 12 shows a schematic view of the output of the binary $\lambda$ sensor.
Figure 13:
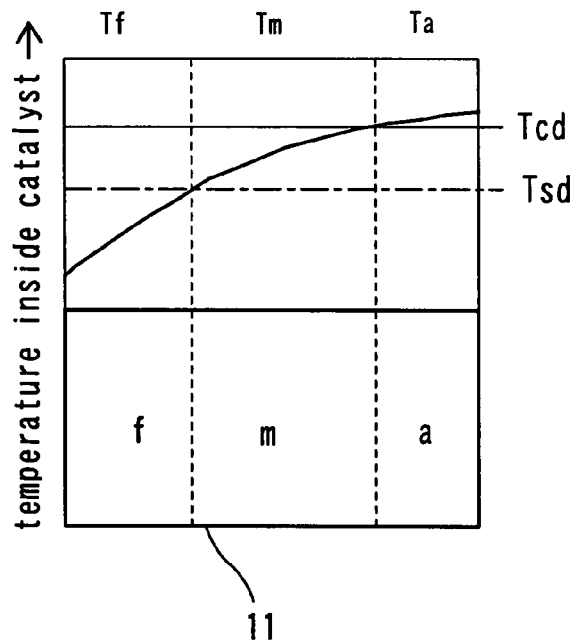
FIG. 13 shows a view of temperature distribution in a catalyst in the case when executing sulfur purge regeneration control according to conventional technology.

An upstream side oxygen concentration sensor ($O_2$ sensor) 13 and a downstream side air excess rate sensor ($\lambda$ sensor) 14 are placed on the upstream side and the downstream side of the NOx occlusion reduction type catalyst 11 respectively. A binary $\lambda$ sensor is used as this $\lambda$ sensor 14. This sensor as shown in FIG. 12 has an output characteristic that its output value sharply changes in the vicinity of a stoichiometric air fuel ratio. It is confirmed that the inside of the catalyst changes into the reduction domain by the outputs of the $O_2$ sensor 13 and the $\lambda$ sensor 14. Also it is confirmed that sulfur separation is certainly performed in the catalyst.

Furthermore, an upstream side temperature sensor 15 and a downstream side temperature sensor 16 for determining the temperature of the NOx occlusion reduction type catalyst 11c are placed on the upstream side and the downstream side of NOx occlusion reduction type catalyst, namely on front side and on rear side, respectively. The temperature difference in the catalyst 11 is estimated by the temperature difference between the temperature sensor 15 and 16 placed in the two positions.

Moreover, a HC supply valve (fuel injector for injecting) 12 for supplying hydrocarbon (HC) F is provided in the exhaust passage 4 on the upstream side of the exhaust gas purification device 10. This hydrocarbon F is kerosene from engine fuel and is also a reducing agent of NOx. This HC supply valve 12 is for making the air fuel ratio of the exhaust gas G lean, rich or stoichiometric (theoretical air fuel ratio state) by direct injecting hydrocarbon F from a fuel tank (not shown) to the exhaust passage 4. The HC supply valve 12 serves as a fuel system rich control means. This HC supply valve 12 may be omitted by performing the same air fuel ratio control as the above by post-injecting of fuel injection in a cylinder of the engine E.

A control unit (ECU: engine control unit) 20 is provided. This control unit 20 controls operation of the engine E on the whole, and at the same time controls the recovery of the purifying ability of the NOx occlusion reduction type catalyst 11c. The detection values from the upstream side $O_2$ sensor 13, the downstream side $\lambda$ sensor 14, the upstream side and downstream side temperature sensors 15, 16 are inputted to the control unit 20. Also the control unit 20 outputs signals for controlling an EGR valve 6, a fuel injection valve 8 of a common rail electric control fuel injection unit or air-intake throttle (air-intake throttle valve) 9 etc. of the engine E.

In the exhaust gas purification system 1, air A passes through a mass air flow sensor (MAF sensor) 17 and a compressor 3a of a turbo charger 3 in the air-intake passage 2. Then, the air A is adjusted in its amount and enters the cylinders through the air-intake manifold 2a. And the exhaust gas G generated in the cylinders goes out to the exhaust passage 4 from the exhaust manifold 4a and drives the turbine 3b of the turbocharger 3. Then, the exhaust gas G becomes the purified exhaust gas Gc by passing through the exhaust gas purification device 10 and is discharged into the atmosphere through a muffler (not shown). Moreover, some exhaust gas G passes through an EGR cooler 7 of an EGR passage 5 as EGR gas Ge. Then the EGR gas Ge is adjusted in its amount by the EGR valve 6 and re-circulated to the air-intake manifold 2a.

Furthermore, the control unit of the exhaust gas purification system 1 is incorporated in the control unit 20 of the engine E and controls the exhaust gas purification system 1 together with operation of the engine E. The control unit of the exhaust gas purification system 1 executes PM regeneration control for removing the PM of the DPF 11b, NOx regeneration control for recovering the NOx occlusion ability of the NOx occlusion reduction type catalyst 11c and sulfur purge control for recovering sulfur poisoning of the NOx occlusion reduction type catalyst 11c.

This PM regeneration control raises the exhaust gas temperature and removes PM by oxidizing the PM captured in the DPF 11b when the accumulated PM amount in the DPF 11b increases and the mesh closed state is deteriorated.

Moreover, the NOx regeneration control computes a release amount $\Delta$NOx of NOx per unit time from the operation state of the engine E, and computes a NOx cumulation value $\Sigma$NOx by cumulating $\Delta$NOx. Starting of the regeneration is determined when the NOx cumulation value $\Sigma$NOx is larger than a given determination value Cn.

Or a NOx purification rate is computed from NOx concentrations of the upstream side and downstream side of the NOx occlusion reduction type catalyst 11 in the NOx regeneration control. Starting of the regeneration of the NOx catalyst is determined when the NOx purifying rate is lower than a given determination value.

Furthermore, in the NOx regeneration control, the air fuel ratio of the exhaust gas is controlled to be a stoichiometric air fuel ratio or in a rich state by using an air-intake system rich control together with a fuel system rich control. In this air-intake system rich control, the air fuel ratio of the exhaust gas is lowered by increasing the EGR amount through control of the EGR valve 6, or by decreasing the new air-intake amount through control of the air-intake closing valve 9. Also, in the fuel system rich control, in addition to air-intake system rich control, the air fuel ratio is lowered through adding fuel into the exhaust gas by post injection when injecting into the cylinders or by injecting into the exhaust pipe.

By these controls, the exhaust gas state is set to a given target air fuel ratio state and at the same time within a given temperature range. By this, occlusion ability of NOx, i.e. NOx purifying ability is recovered, and regeneration of the NOx catalyst is performed. Moreover, the given target air fuel ratio state is set to about 0.8 to 1.0 for excess air rate conversion depending on the catalyst type. Also, the given temperature range is about 200° C. to 600° C. depending on the catalyst type.

Moreover, the present invention relates to a sulfur purge regeneration control of the NOx occlusion reduction type catalyst 11. Since in NOx regeneration control for recovering the NOx occlusion ability, conventional technology can be used, a more detailed description for NOx regeneration control is omitted.

On the other hand, in the sulfur purge regeneration control, it is determined whether or not sulfur is accumulated up to the lowering of the NOx occlusion ability according to the methods of adding up the total amount of sulfur accumulation. By this, it can be determined whether or not the sulfur purge control has started. That is, the sulfur purge starts when the amount of sulfur accumulation is larger than the given determination value.

Furthermore, in the sulfur purge regeneration control, the temperature Tc of NOx occlusion reduction type catalyst 11c is raised to the resolution temperature Tsd of the sulfur resolution temperature by the air-intake system control of the EGR control or air-intake throttling control and by the fuel system control of post injection or injection into the exhaust pipe. At the same time, the air fuel ratio of the exhaust gas is controlled. Through these, effective sulfur purge is performed.

In the exhaust gas purification system 1, the sulfur purge regeneration control of the NOx occlusion reduction type catalyst 11c is performed by the control unit of the exhaust gas purification system 1 incorporated in the control unit 20 of the engine E.

This sulfur purge control adds up the sulfur accumulation amount and determines that sulfur is accumulated up to the lowering of the NOx occlusion ability if the sulfur accumulation amount is not less than a given determined value. And, the sulfur purge control is started. In this sulfur purge control, the sulfate is not resolved or released if it is not in a rich condition of about 600° C. to 700° C. depending on the catalyst type. For this, from the view point of effective utilization of energy, the PM regeneration control of the DPF 11b is executed prior to this sulfur purge control. Thereby, raising the exhaust temperature by PM burning and raising the temperature of the NOx occlusion reduction type catalyst 11c are performed.

Moreover, this sulfur purge control method makes the gas amount such as intake air amount and EGR gas amount constant by controlling the opening of the intake throttle valve 9 and the EGR valve 6, and at the same time makes a high temperature rich atmosphere by post injection or injection in the exhaust pipe. Moreover, the air fuel ratio of the inlet side of the NOx occlusion reduction type catalyst 11c is controlled by alternately repeating a control set to the rich side of 0.85 to 0.95 for excess air rate conversion, preferably 0.9 and a control set to the lean side of 1.05 to 1.15 for excess air rate conversion, preferably 1.1.

In addition, in this sulfur purge control, a time rate of a control set to the rich side and a control set to the lean side is set to 5:2 to 4:3 for rich side control and lean side control respectively. Moreover, in a time per one cycle of a control set to the rich side and a control set to the lean side, for example, the time of rich side control is about 3 s to 5 s and the time of lean side control is about 2 s to 4 s. The time from start to end of the sulfur purge control repeating this cycle is about 3 min.

This method of the air fuel ratio control of the catalyst inlet side can provide a sufficient amount of the reducing agent for raising the exhaust temperature, and can give the required amount of $O_2$ (oxygen) for oxidizing $H_2S$ (sulfur hydrogen) into $SO_2$ (sulfur dioxide).

Raising the temperature of the exhaust gas and oxygen atmosphere can be made to be appropriate and enough $O_2$ to oxidize $H_2S$ into $SO_2$ can be supplied by not maintaining a rich state of the air fuel ratio on the inlet side but by making repeated lean states.

As a result, $H_2S$ can be certainly oxidized into $SO_2$ and the noxious odor of $H_2S$ can be avoided. At the same time, it is possible to facilitate sulfur purging through $SO_2$ and maintain the temperature during sulfur purge control by the heat generated in this oxidation. In this way, the rate of $SO_2$ thereto is increased through restricting the generated amount of $H_2S$, and also the generated amount of $SO_2$ is saved. As a result, since sulfur purge is completed early, the required time for sulfur purge control is shortened.

Moreover, in this sulfur purge control method, the target air fuel ratio of the inlet side of the NOx occlusion reduction type catalyst 11c is controlled by feedback control in such a way that the air fuel ratio of the outlet side thereof is in a stoichiometric state during sulfur purge control. At the same time, the air fuel ratio of the inlet side is computed based on the taken intake amount and the load (fuel injection amount).

That is, the value of the downstream side λ sensor 14 of the catalyst outlet (back stream side) is controlled to be always equal to a stoichiometric value or less. The target value of the inlet air fuel ratio is controlled by feedback control to be in a stoichiometric air fuel ratio when the value of the downstream side λ sensor 14 is slightly rich. Thus, sulfur purge can be performed by always setting the air fuel ratio in stages after the middle stage of the catalyst to less than a stoichiometric air fuel ratio.

Figure 2:
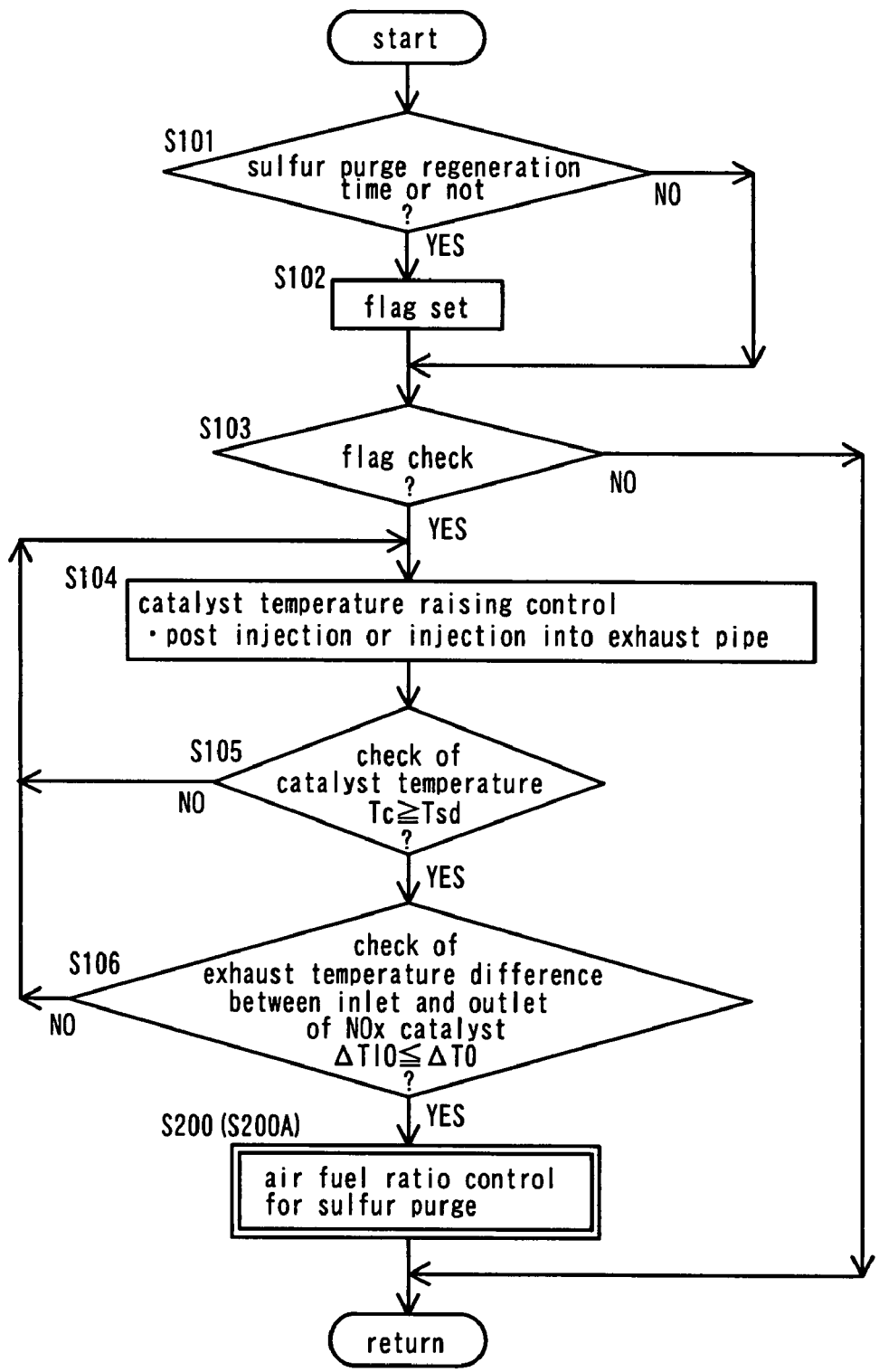
FIG. 2 shows a view of illustrating an embodiment of sulfur purge regeneration control flow for a NOx occlusion reduction type catalyst.
Figure 3:
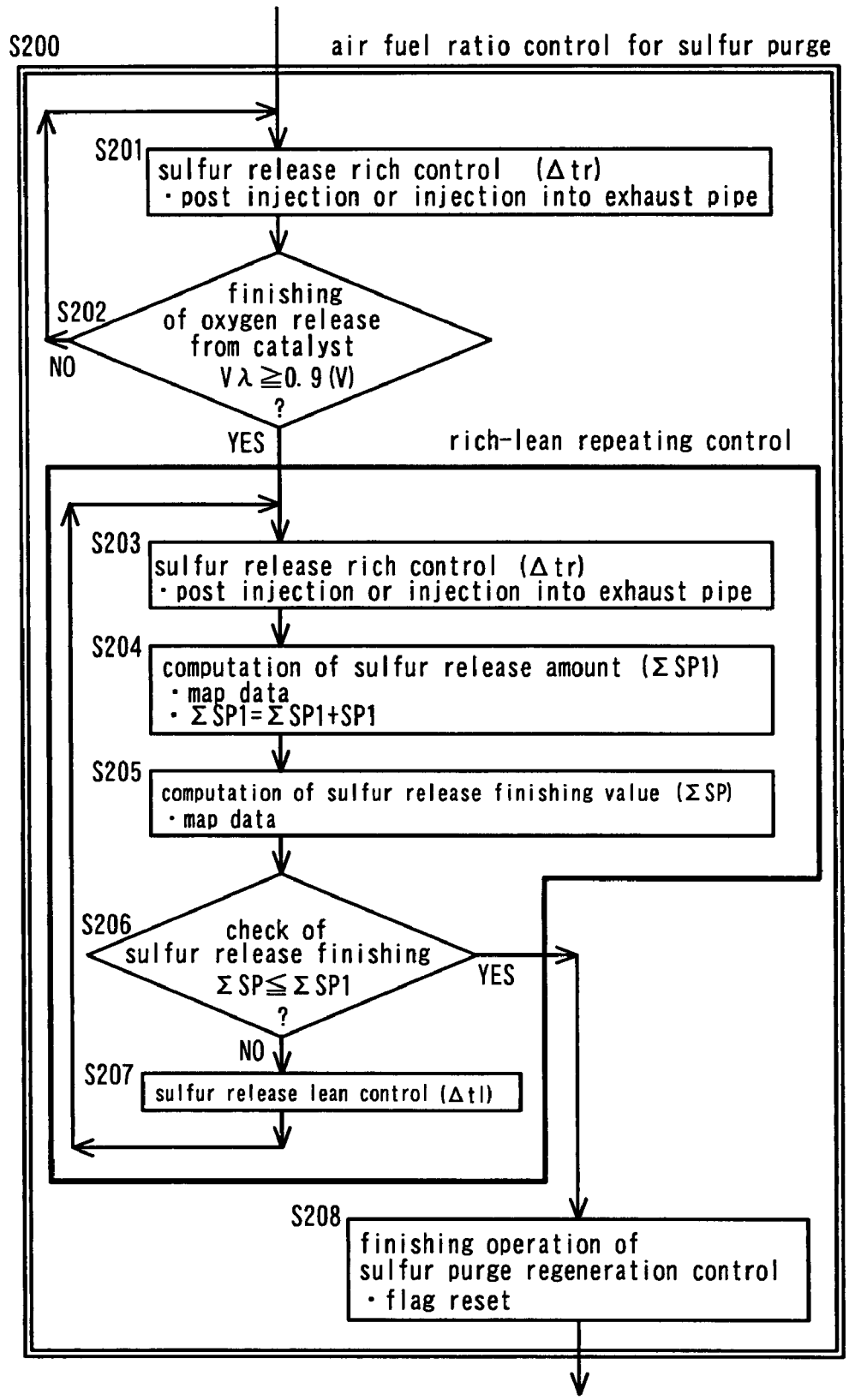
FIG. 3 shows a view illustrating the first example of an air fuel ratio control for sulfur purge.
Figure 4:
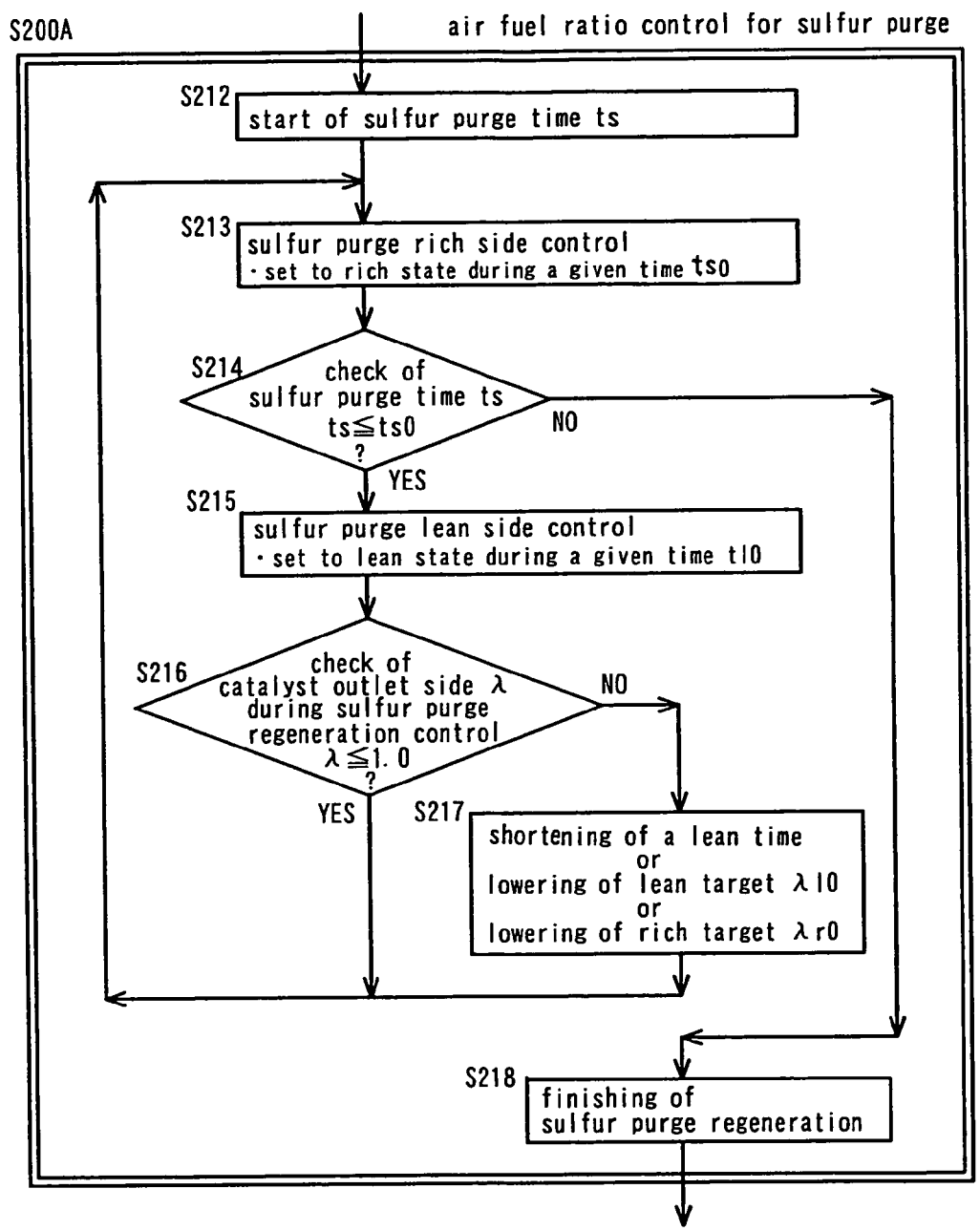
FIG. 4 shows a view illustrating the second example of an air fuel ratio control for sulfur purge.

In this exhaust gas purification system 1, this sulfur purge regeneration control is executed according to the sulfur purge regeneration control flow as illustrated in FIGS. 2 to 4 by using the control unit of the exhaust gas purification system 1 incorporated in the control unit 20 of the engine E. Moreover, the sulfur purge regeneration control flow as shown in FIG. 2 is executed together with the other control flows of the engine upon operation for the engine E.

When the sulfur purge regeneration flow as shown in FIG. 2 is started, in step S101, the sulfur poisoning amount of the catalyst is computed from the accumulation of the fuel consumption amount, and it is determined whether or not there is sulfur purge regeneration timing. If there is sulfur purge regeneration timing, in step S102, a flag for sulfur purge regeneration is set. If there is not sulfur purge regeneration timing, it goes to step S103 without doing anything else.

In step S103, the flag for sulfur purge regeneration is confirmed. In the case where the flag for sulfur purge regeneration is not set and it is not time for sulfur purge regeneration, it goes to "return" and this sulfur purge regeneration control routine is finished. In the case where the flag for sulfur purge regeneration is set to "on", i.e. sulfur purge regeneration time, it goes to step S104, and it enters into temperature raising control of the catalyst.

In the method of raising the temperature of the catalyst of step S104, a fuel system control such as post injection, injection into the exhaust pipe and an intake system control such as an intake throttle, or the EGR valve 6 are used together with each other and the other method is used if necessary. In this post injection and injection into the exhaust pipe, HC is supplied to the oxidation catalyst 11a, and this HC is oxidized by the catalyst function of the oxidation catalyst 11a. The heat generated by the oxidation raises the temperature of the exhaust gas and temperature of the NOx occlusion reduction type catalyst 11c.

In next step S105, it is determined whether or not the catalyst temperature Tc is not less than the sulfur resolution temperature Tsd. In the case where the catalyst temperature Tc is less than the sulfur resolution temperature Tsd, it returns to step S104 and executes catalyst temperature raising control. Also, in the case where the catalyst temperature Tc is not less than the sulfur resolution temperature Tsd, it goes to step S106.

In this step S106, it is confirmed that the temperature distribution of the NOx occlusion reduction type catalyst 11c is uniform. This confirmation is performed by confirming that temperature difference ΔTIO between the inlet side and the outlet side of the NOx occlusion reduction type catalyst 11c is not more than a given temperature value (25° C. herein) ΔT0. If the temperature difference ΔTIO is not more than a given temperature difference ΔT0, it goes to step S200 of the air fuel ratio control for sulfur purge to perform air fuel ratio control. If the temperature difference ΔTIO is more than a given temperature value, it returns to step S104. This given temperature value ΔT0 is within a range of 5° C. to 25° C., preferably 5° C.

Figure 6:
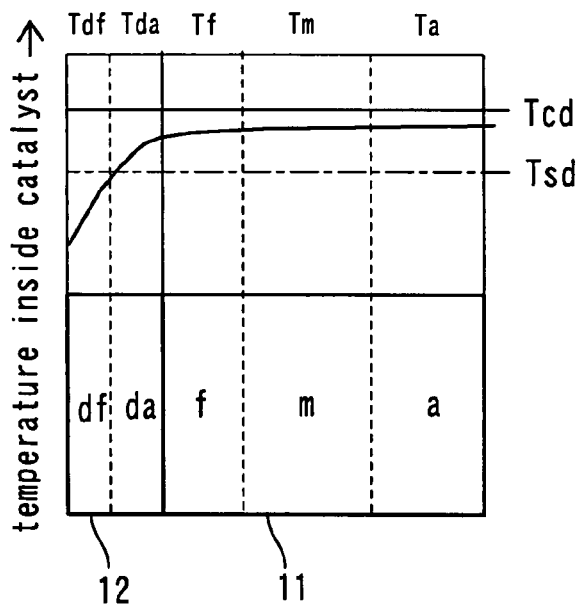
FIG. 6 shows a view illustrating temperature distribution in a catalyst in the case when executing control of sulfur purge regeneration control flow.

According to the sulfur purge regeneration control flow shown in FIG. 2, when starting the sulfur purge regeneration control, at first the temperature Tda of the downstream area of the oxidation catalyst 11a is raised to the sulfur resolution temperature Tsd by post injection or injection into the exhaust pipe. Then, the operation conditions are continued until the temperature Ta of the downstream area of the NOx occlusion reduction type catalyst 11c is raised. Thereby, temperatures Tf, Tm, and Ta of the NOx occlusion reduction type catalyst 11c are controlled up to the sulfur resolution temperature Tsd or more as shown in FIG. 6.

Furthermore, it is confirmed that the temperature of the NOx occlusion reduction type catalyst 11c is substantially uniformly raised based on the condition that the temperature difference ΔTIO of the inlet exhaust gas temperature and outlet exhaust gas temperature is a given temperature value ΔT0 (25° C. herein) or less and then it enters into air fuel ratio control for sulfur purge.

In the next step S200 (S200A) of air fuel ratio control for sulfur purge, some methods can be used as the sulfur separation operation. Regarding this step S200 (S200A) of air fuel ratio control for sulfur purge, the first example of S200 of air fuel ratio control for sulfur purge shown in FIG. 3 and the second example of S200A of air fuel ratio control for sulfur purge shown in FIG. 4 will be described.

Figure 5:
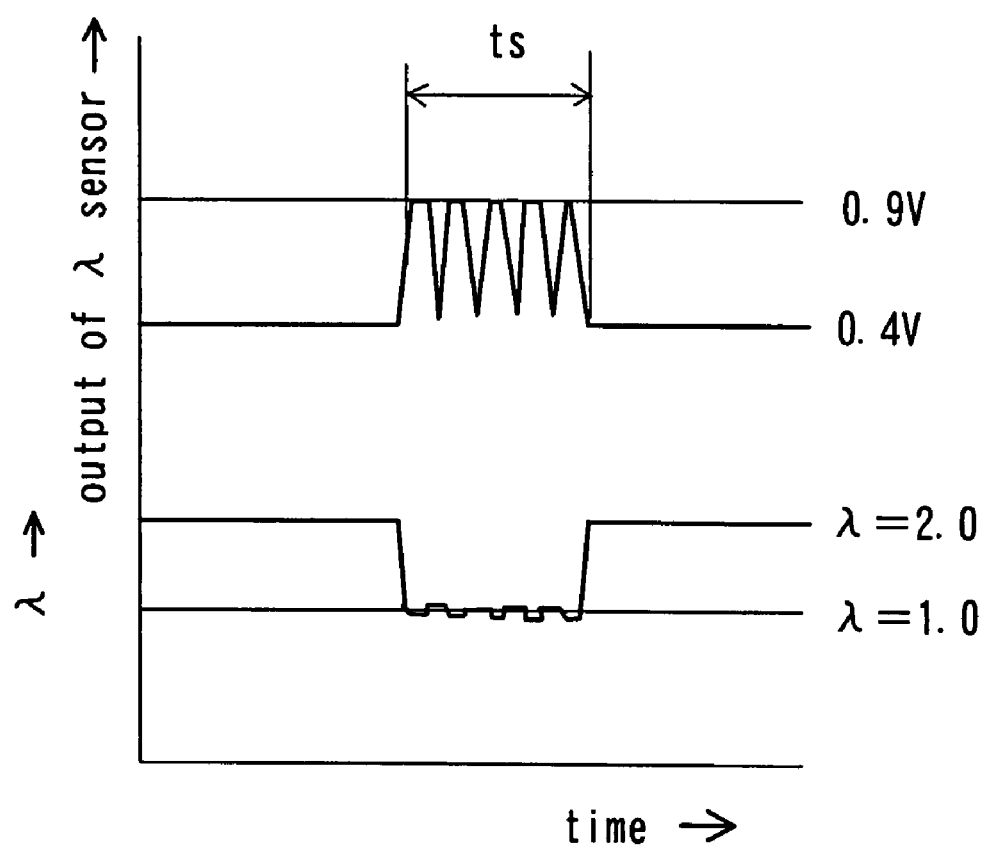
FIG. 5 shows a schematic view of the excess air rate ($\lambda$) and output of a binary $\lambda$ sensor in rich/lean repeating control for an air fuel ratio sulfur purge.

In the first example of air fuel ratio control for sulfur purge shown in FIG. 3, a method for sulfur purging while restricting generation of $H_2S$ is used by alternately repeating a control (for example 4s) set to the rich side of the air fuel ratio and a control (for example 3s) set to the lean side thereof at a short time interval (for example 7s) in pulse form during a time ts of air fuel ratio control for sulfur purge as shown in FIG. 5.

In this case, it has been experimentally obtained that a time rate of a control set to the rich side to a control set to the lean side is preferably set to 5:2 to 4:3 for rich:lean. And this air fuel ratio control is executed by using a binary λ sensor having an output characteristic that includes an output value sharply changing in the vicinity of the stoichiometric air fuel ratio as shown in FIG. 12.

In the first step S201 in step S200 as a first control of the air fuel ratio control for sulfur purge, sulfur release rich control is executed for a given time Δtr by post injection or injection into the exhaust pipe. The given time Δtr is a time related to the interval for determining whether or not it reaches a target rich air fuel ratio. The sulfur release rich control is executed in a way in which the air fuel ratio (value converted from λ) detected by the λ sensor becomes the target rich air fuel ratio. Then it goes to step S202.

In step S202, it is determined whether or not the air fuel ratio detected by the λ sensor becomes the target rich air fuel ratio. In the case where this air fuel ratio becomes the target rich air fuel ratio, it is determined that oxygen released from the NOx occlusion reduction type catalyst 11c is finished and it enters the rich-lean repeat control. In the determination whether or not this air fuel ratio becomes the target rich air fuel ratio, the characteristic that the value of the binary λ sensor in the downstream side of the NOx occlusion reduction type catalyst 11c is sharply changed is used. That is, the time when target rich control is attained is determined as the time when the sensor value moves to the stoichiometric side.

In this step S203, the air fuel ratio rich state is maintained during a given rich maintaining time Δtr (for example, 4s to 5s). Next, a sulfur release amount ΣSP1 is computed in step S204. On the computation of the sulfur release amount ΣSP1, at first a sulfur separation amount SP1 is computed from the measured engine speed and the catalyst temperature referring to map data. This map data is recorded in the ECU in advance by a pretest and data in which the sulfur separation amount SP1 is recorded on the basis of the engine speed and the catalyst temperature. The sulfur release amount ΣSP1 is computed by summing the sulfur separation amount SP1.

In next step S205, a sulfur release finishing value ΣSP is computed. This sulfur release finishing amount ΣSP is computed from the measured engine speed and the catalyst temperature. This map data has been recorded in the ECU by a preliminary examination in advance and is data in which the sulfur release finishing value ΣSP is recorded on the basis of the engine speed and the catalyst temperature.

Next, the sulfur release finishing is confirmed by whether or not the sulfur release amount ΣSP1 is larger than the sulfur release finishing value ΣSP. In this confirming, in the case where the sulfur release amount ΣSP1 is not larger than the sulfur release finishing value ΣSP and the sulfur release finishing is not determined, it is determined to continue the air fuel ratio control for sulfur purge and goes to step S207.

In step S207, the air fuel ratio lean control is maintained during a given lean maintaining time Δt1 (for example, 2 s to 3 s). Furthermore, the rate of a rich maintaining time to a lean maintaining time is Δtr:Δt1=5:2 to 4:3. Additionally, in the case where the rich maintaining time and the lean maintaining time are not constant and are variable, the air fuel ratio control is executed in a way such that the rate of the summation ΣΔtr of the rich maintaining time to the summation ΣΔt1 of the lean maintaining time is ΣΔtr:ΣΔt1=5:2 to 4:3.

Then, it returns to step S203 and the air fuel ratio rich state is maintained during a given maintaining time Δtr. Step S203 to step S207 are repeated until the sulfur release finishing is confirmed, i.e. the sulfur release amount ΣSP1 is larger than the sulfur release finishing value ΣSP in step S206.

In step S206, in the case where the sulfur release finishing is confirmed, it goes to step S208. In this step S208, the sulfur purge regeneration control such as a shift operation of the air fuel ratio rich state into the air fuel ratio lean state or a reset operation of the sulfur release flag is finished.

The air fuel ratio control for sulfur purge according to the control flow shown in FIG. 3 is executed in such a way that at first the air fuel ratio is small and becomes stoichiometric in the downstream of the NOx occlusion reduction type catalyst 11c. And when reaching the stoichiometric value, it is determined that the oxygen release from the catalyst is finished. Then, the repeating control of the air fuel ratio rich state and the air fuel ratio lean state is executed.

At this time, the air fuel ratio is controlled in a way in which the sensor value is moved by using the characteristic that the output of the binary λ sensor 14 in the downstream of the NOx occlusion reduction type catalyst 11c is sharply changed in the vicinity of the stoichiometric air fuel ratio. This repeat control prevents $H_2S$ from generating and at the same time the slip of HC, CO (carbon monoxide) is prevented. If $O_2$ is not present on the surface of the catalyst, sulfur is connected with $H_2$ (hydrogen) to become $H_2S$. Therefore, this repeat control prevents $O_2$ from disappearing.

This rich-lean repeat control is continued until sulfur release is finished and the control is finished when confirming the sulfur release finishing. In this manner, the air fuel ratio control for sulfur purge is finished, returns to the control of FIG. 2, and the sulfur purge regeneration control is finished.

Next, a second embodiment of air fuel ratio control for sulfur purge shown in FIG. 4 will be described. In this air fuel ratio control, it is determined that the sulfur purge is finished when a lapse time of the air fuel ratio control for sulfur purge exceeds a given sulfur purge finishing time ts0. For that reason, when going to step S200A, in step S212, a timer of lapse time ts is started and the measure of the lapse time ts of the air fuel ratio control for sulfur purge is started.

In the next step S213, the sulfur purge rich side control in which a rich state is maintained during a given time ts0 is executed. In the next step S214, the sulfur purge time ts is checked, and it is determined whether or not the sulfur purge regeneration control is finished. If the sulfur purge time ts exceeds a given sulfur purge finishing time ts0, it is determined that the sulfur purge is finished, operation of the sulfur purge regeneration completion is executed in step S218 and it returns to the control flow in FIG. 2.

If this sulfur purge time ts does not exceed a given sulfur purge completion time ts0, in step S215, the sulfur purge side control in which the lean state is maintained during a given time t10 is executed. In step S216 following step S215, the catalyst outlet side λ (excess air rate) or the catalyst oxygen concentration is checked during the sulfur purge regeneration control. In the case where the catalyst outlet side λ is not stoichiometric (λ>1.0), in step S217, the catalyst outlet side λ is lowered by carrying out shortening of the lean time t10, lowering of the lean target λ10 for the catalyst inlet side λ, lowering of the rich target λr0 for the catalyst inlet side λ, or with these in combination, then it returns to step S213. Also, in the case where the catalyst outlet side λ is not stoichiometric (λ≦1.0), it returns to step S213.

In addition, the repeat intermittent pulse control of the sulfur purge rich side control in step S213 and the sulfur purge lean side control in step S215 are executed until the sulfur purge time ts exceeds the sulfur purge completion time ts0. In step S214, when the sulfur purge time ts exceeds a given sulfur purge completion time ts0, it is determined that the sulfur purge is completed, and operation for the sulfur purge finishing is performed in step S218.

Thereafter, when finishing the air fuel ratio control for sulfur purge in FIG. 4, it returns again after returning to the control flow in FIG. 2 and it returns to a main control flow. After this, the sulfur purge regeneration control flow in FIG. 2 is called for again. Thus, the sulfur purge regeneration control flow is repeated to engine stop.

In the case where an engine key is OFF on the way to the control in FIGS. 2 to 4, a squeeze is produced and it returns after the finishing processing necessary in each squeezed step is performed. These processes are not shown in FIGS. 2 to 4. Then, the main control is finished and at the same time the sulfur purge regeneration control flow is finished.

According to the above exhaust gas purification system and the sulfur purge regeneration control method of the same, in the sulfur purge regeneration control for regenerating the catalyst from sulfur poisoning of the NOx occlusion reduction type catalyst 11c, the air fuel ratio control for sulfur purge is executed after substantially uniformly maintaining the interior temperature of the catalyst Tc not less than the sulfur resolution temperature Tsd, and sulfur in the NOx occlusion reduction type catalyst 11c is uniformly removed.

In this manner, shortening of the lifetime of the catalyst by sulfur poisoning can be avoided, and partial high temperatures in the downstream area of the interior of the catalyst can be avoided. Since thermal deterioration due to partial high temperatures can be avoided, the shortening of the lifetime depending on the thermal deterioration can be restrained.

In addition, the air fuel control is executed by feedback control in such a way that the air fuel ratio of the inlet side of the NOx occlusion reduction type catalyst 11c is periodically repeated between a rich state of 0.85 to 0.95 for excess air rate conversion and a lean state of 1.05 to 1.15 for excess air rate conversion and the air fuel ratio of the downstream area of the NOx occlusion reduction type catalyst 11c is in a stoichiometric state. By doing so, a reducing agent for raising the exhaust temperature can be sufficiently guaranteed and at the same time it is possible to provide for a necessary amount of oxygen for oxidizing $H_2S$ into $SO_2$.

By this, the generated amount of $H_2S$ can be restrained and the rate of $SO_2$ thereto can be increased by adequately setting the oxygen atmosphere and the exhaust gas temperature and certainly oxidizing $H_2S$ into $SO_2$. At the same time, by facilitating sulfur purge and maintaining the high temperature necessary for sulfur purge, the generated sulfur purge amount can be guaranteed. Therefore, since sulfur purge can be completed early, the sulfur purge control can be finished in a short time.

Figure 7:
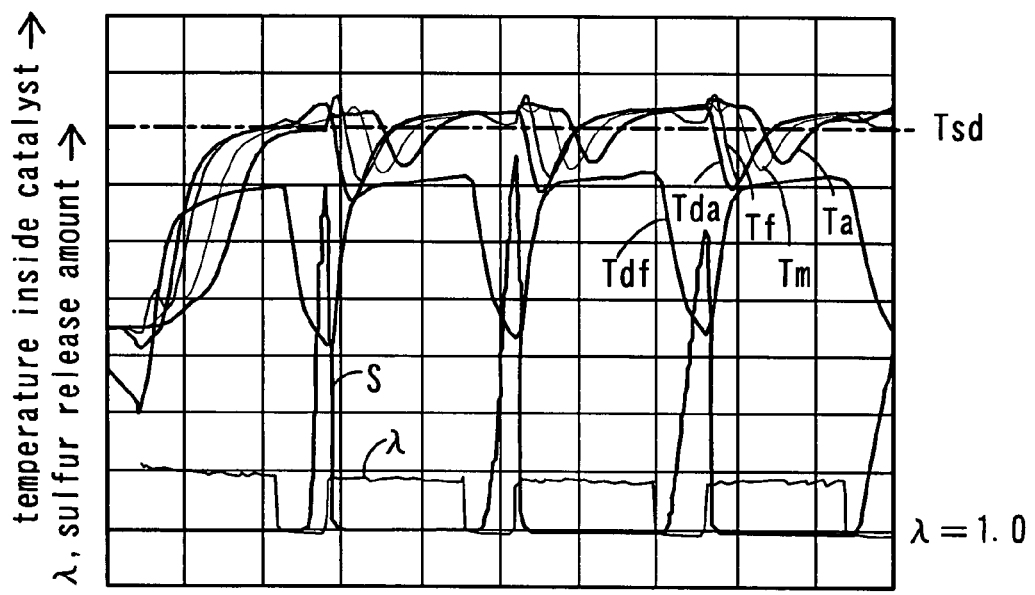
FIG. 7 shows a view illustrating a time series of temperature distribution in a catalyst in the case when executing control of regeneration control flow sulfur purge.
Figure 8:
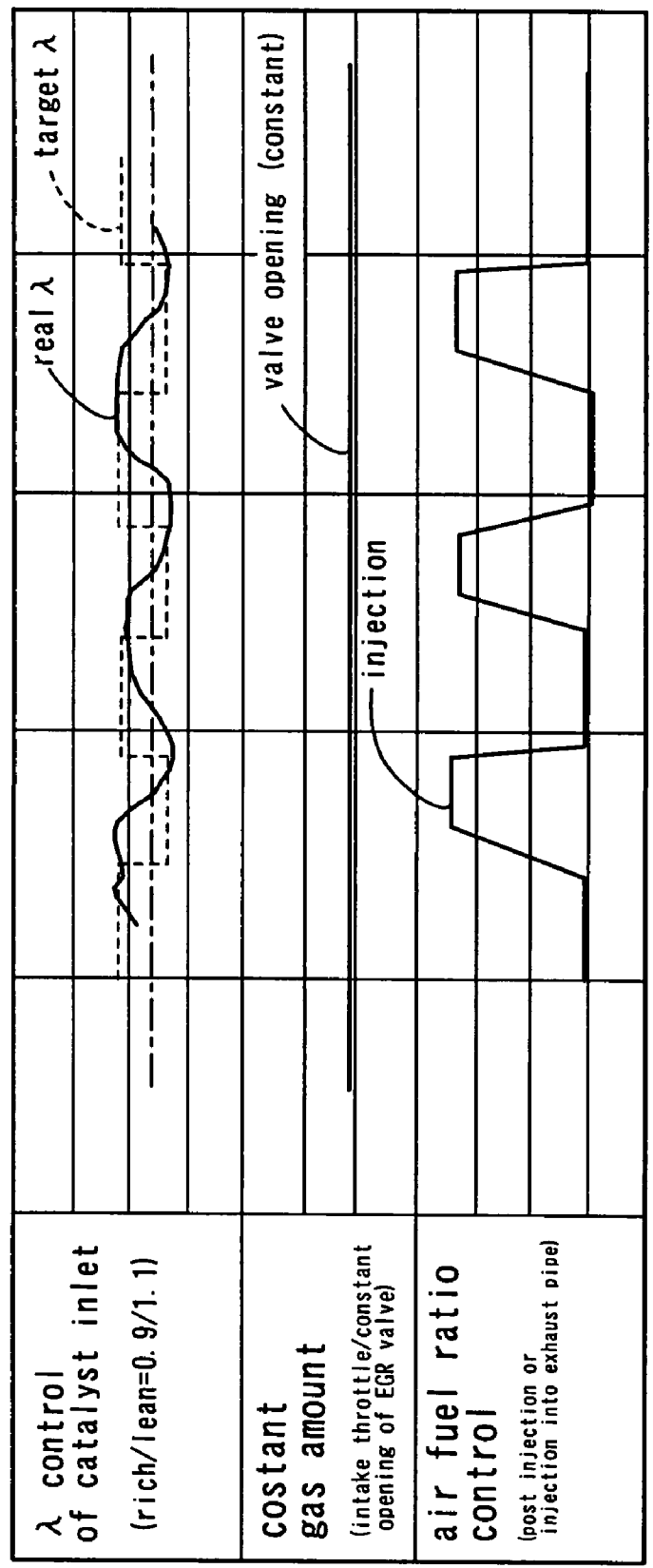
FIG. 8 shows a schematic view of air fuel ratio control for sulfur purge in FIG. 4.
Figure 14:
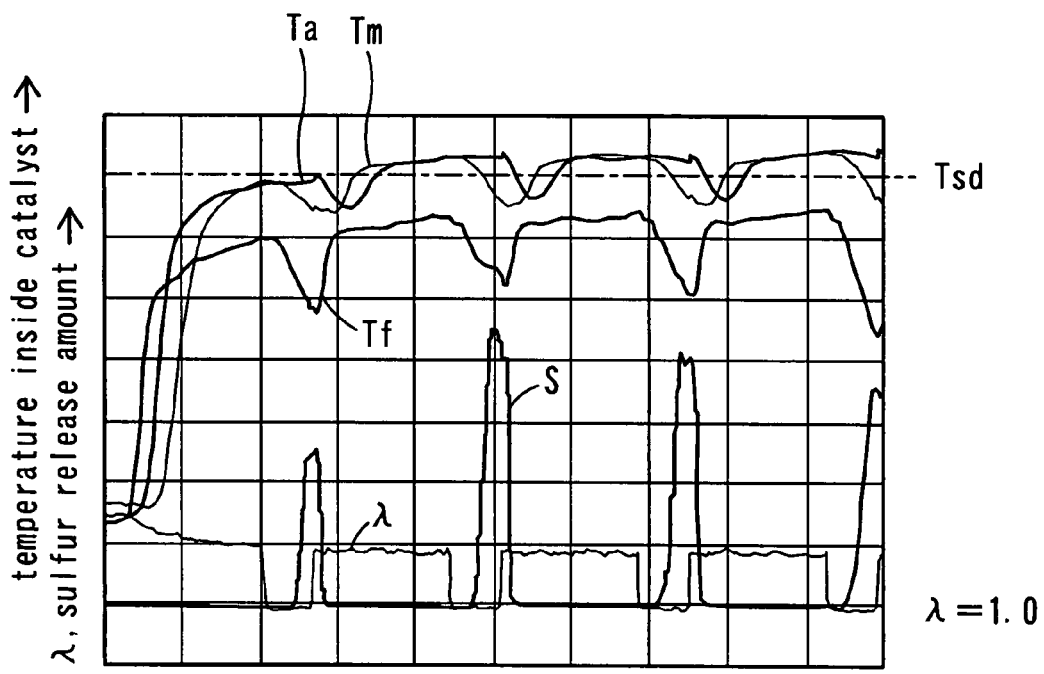
FIG. 14 shows a view illustrating a time series of temperature distribution in a catalyst in the case when executing sulfur purge regeneration control according to conventional technology.

An example of a time series measured with an excess air rate λ according to the control flow of FIG. 2 and FIG. 3, a sulfur release amount S and the upstream side temperature Tdf of the oxidation catalyst 11a, the downstream side temperature Tda thereof, the upstream side temperature Tf of the NOx occlusion reduction type catalyst 11c, the midstream side temperature Tm thereof and the downstream side temperature Ta is shown in FIG. 7. Compared with the conventional technology shown in FIG. 14, in FIG. 7, it is found that the interior temperature of the NOx occlusion reduction type catalyst 11c, in particular, the upstream side temperature Tf, is uniform and is equal to the sulfur resolution temperature Tsd or more.

Figure 9:
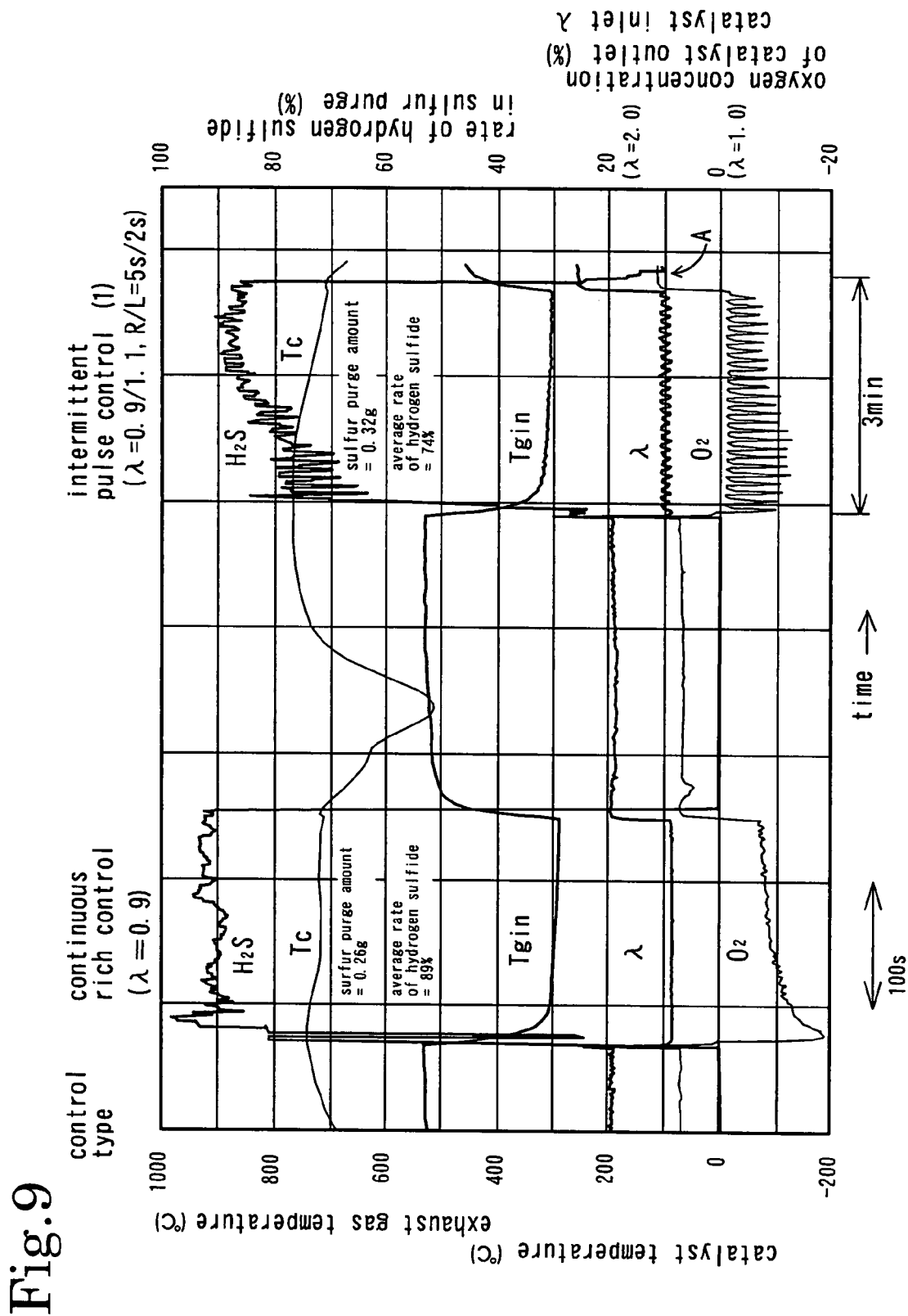
FIG. 9 shows a view illustrating a time series of sulfur purge control of continuous rich control and intermittent pulse control 1.
Figure 10:
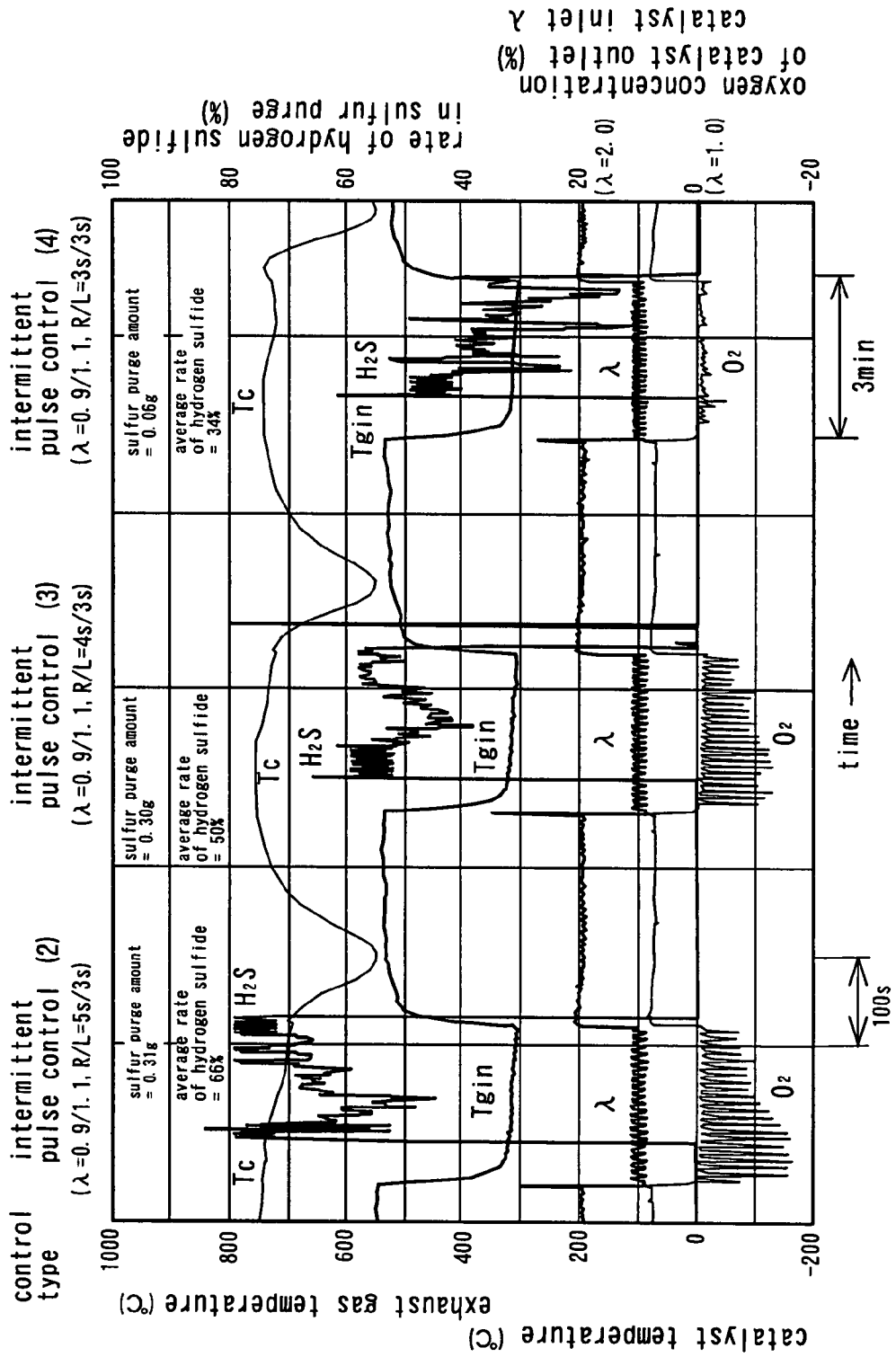
FIG. 10 shows a view illustrating sulfur purge control of intermittent pulse controls 2 to 4.
Figure 11:
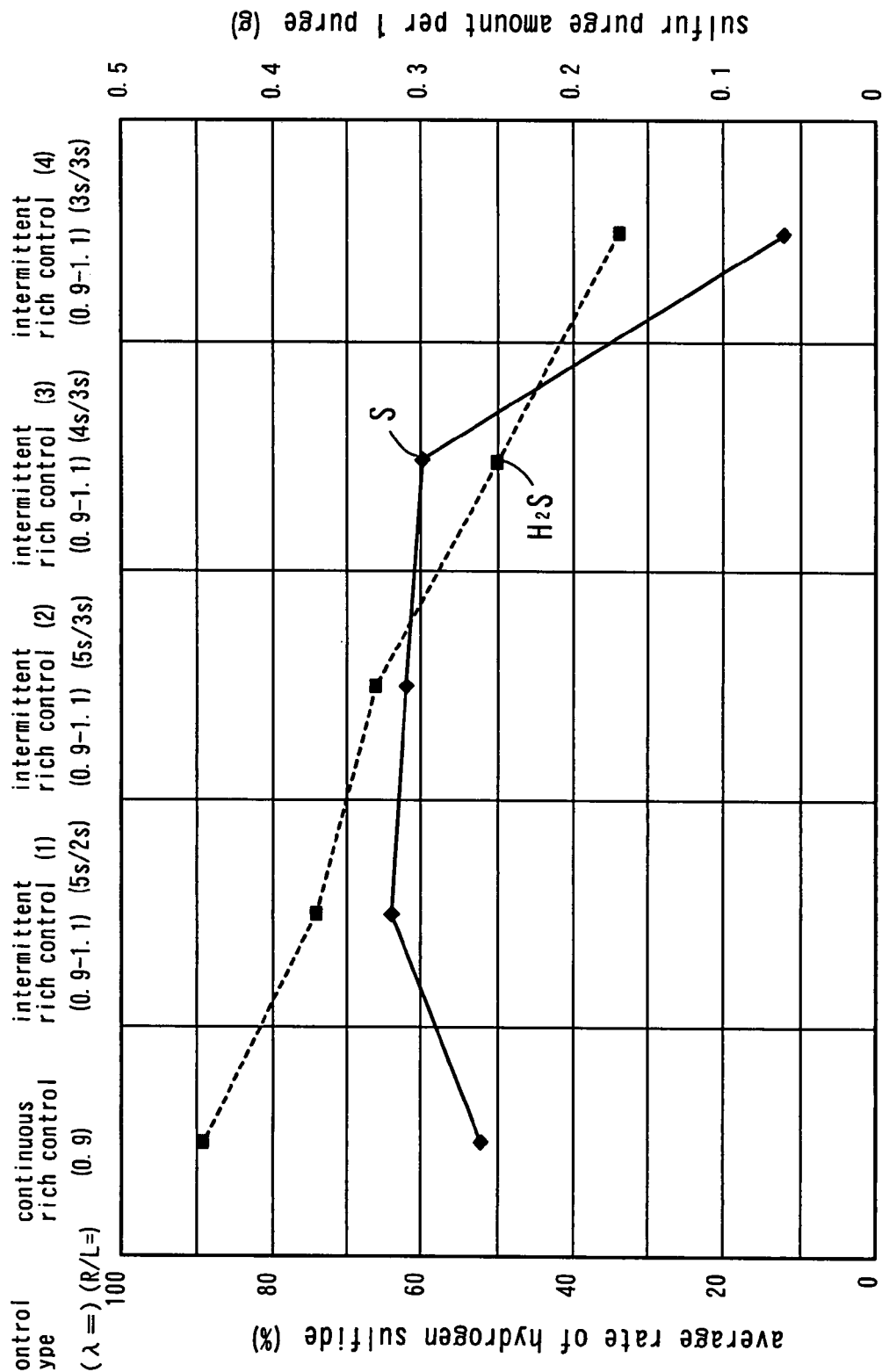
FIG. 11 shows a view illustrating the rate of sulfur purge amount and average hydrogen sulfide of experimental results from sulfur purge control of continuous rich control and intermittent pulse controls 1 to 4.

Moreover, in order to examine variation changes in the release rate of sulfur hydrogen depending on differences in sulfur purge control methods, an example of continuous rich control and four examples of intermittent pulse control of the air fuel ratio control for sulfur purge are executed and these results are shown in FIGS. 9 to 11. In either sulfur purge control the regeneration of DPF 11b is performed in advance and raising of the exhaust gas temperature Tgin and the catalyst temperature using PM burning is therefore intended.

In conventional continuous rich control, the excess air rate in the inlet side of catalyst shown as λ is set to a target air fuel ratio of 0.9 and is set to be constant during a 3 minute sulfur purge control. In this sulfur purge control, it is found that the sulfur purge amount is 0.26 g, the average rate of sulfur hydrogen is 89% and is released as $H_2S$ (hydrogen sulfide). The oxygen concentration of the downstream side of the catalyst as "$O_2$" shown in the diagrams is small at first and increased gradually.

In the realized examples of intermittent pulse control, the target air fuel ratio is set to 0.9 for an excess air rate conversion in a rich air fuel ratio and 1.1 for an excess air rate conversion in a lean air fuel ratio. And the rich control time R and the lean control time L of the intermittent pulse control are set to R/L=5 s/2 s in Example 1, R/L=5 s/3 s in Example 2, R/L=4 s/3 s in Example 3 and R/L=3 s/3 s in Example 4.

As a result, the sulfur purge amount and the average amount of hydrogen sulfide as "$H_2S$" shown in the diagrams are 0.32 g and 74% in Example 1, 0.31 g and 66% in Example 2, 0.30 g and 50% in Example 3, 0.06 g and 34% in Example 4. The oxygen concentration in the downstream side of the catalyst as "$O_2$" shown in the diagrams is illustrated in FIG. 9 and FIG. 10.

In the result obtained in FIGS. 9, 10, the sulfur purge amount S per 1 purge and the average rate of sulfur hydrogen $H_2S$ are shown in FIG. 11. In these examples according to FIG. 11, since the sulfur purge amount S of Example 3 is larger than the others and the average rate of sulfur hydrogen $H_2S$ of Example 3 is lower than the others, Example 3 is the most appropriate control condition.

INDUSTRIAL APPLICABILITY

An exhaust gas purification system and a method for sulfur purge control of the same according to the present invention having the above excellent effects can be very effectively utilized as an exhaust gas purification system and as a method for sulfur purge control of the same for exhaust gas of not only internal combustion engines mounted on vehicles, but in factories with fixed type internal combustion engines such as various industrial machines.

What is claimed is:

1. A method of sulfur purge control of an exhaust gas purification system, comprising:

providing a NOx occlusion reduction type catalyst for occluding NOx when an air fuel ratio in the exhaust gas is lean, and releasing and reducing the occluded NOx when the air fuel ratio in the exhaust gas is rich;

providing an oxidation catalyst on an upstream side of the NOx occlusion reduction type catalyst:

sensing a need for sulfur purge;

executing the sulfur purge control for recovering deterioration of the NOx occlusion reduction type catalyst caused by sulfur poisoning thereof, including raising a temperature of the NOx occlusion reduction type catalyst until the temperature is equal to or greater than sulfur resolution temperature, judging whether a temperature difference between an inlet side and an outlet side of the NOx occlusion reduction type catalyst is within a given range, and when it is judged that the temperature difference is not within the given range, raising a temperature of the NOx occlusion reduction type catalyst until the temperature difference is within the given range.

2. The method of sulfur purge control of the exhaust gas purification system according to claim 1, further comprising setting the given at 5° C. to 25° C.

3. The method of sulfur purge control of the exhaust gas purification system according to claim 1, wherein the raising the temperature comprises controlling an air fuel ratio of the inlet side of the NOx occlusion reduction type catalyst to alternately repeat a control set to a rich side of the NOx occlusion reduction type catalyst and a control set to a lean side of the NOx occlusion reduction type catalyst.

4. The method of sulfur purge control of the exhaust gas purification system according to claim 3, further comprising performing the air fuel ratio control so that a target air fuel ratio of the inlet side is set to 0.85 to 0.95 in excess air rate conversion in the rich side control, and to 1.05 to 1.15 in excess air ratio conversion in the lean side control upon the sulfur purge control.

5. The method of sulfur purge control of the exhaust gas purification system according to claim 4, wherein performing the air fuel ratio control further comprises feedback controlling the target air fuel ratio of the inlet side so that an air fuel ratio of the outlet side of the NOx occlusion reduction type catalyst is in a stoichiometric state.

6. The method of sulfur purge control of the exhaust gas purification system according to any one of claims 3 to 5, wherein performing the air fuel ratio control further comprises using a time rate of the repeated controls between the control set to a rich side and the control set to a lean side "wherein a rich side control time: a lean side control time=5:2 to 4:3".

7. An exhaust gas purification system, comprising a NOx occlusion reduction type catalyst for occluding NOx when an air fuel ratio in the exhaust gas is lean, and releasing and reducing the occluded NOx when the air fuel ratio in the exhaust gas is rich, an oxidation catalyst disposed in an upstream side of the NOx occlusion reduction type catalyst, a sensor for detecting a sulfur amount in the NOx occlusion reduction type catalyst, and a sulfur purge controller for recovering deterioration caused by sulfur poisoning of the NOx occlusion reduction type catalyst, including a fuel system controller to raise a temperature of the NOx occlusion reduction type catalyst to a temperature equal to or greater than sulfur resolution temperature, a device for judging whether a temperature difference between an inlet side and an outlet side of the NOx occlusion reduction type catalyst is within a given range, and when it is judged that the temperature difference is not within the given range, the fuel system controller raises the temperature of the NOx occlusion reduction type catalyst.

8. The exhaust gas purification system according to claim 7, wherein the given range is 5° C. to 25° C.

9. The exhaust gas purification system according to claim 7, wherein the fuel system controller alternately repeats a control set to a rich side and a control set to a lean side for the air fuel ratio of the inlet side of the NOx occlusion reduction type catalyst.

10. The exhaust gas purification system according to claim 9, wherein the sulfur purge controller sets a target air fuel ratio of the inlet side of the NOx occlusion reduction type catalyst to 0.85 to 0.95 in an excess air rate conversion in the rich side control, and 1.05 to 1.15 in an excess air rate conversion in the lean side control.

11. The exhaust gas purification system according to claim 10, wherein the sulfur purge controller feedback controls the target air fuel ratio of the inlet side of the NOx occlusion reduction type catalyst so that an air fuel ratio of the outlet side is in a stoichiometric state.

12. The exhaust gas purification system according to any one of claims 9 to 11, wherein the sulfur purge controller sets a time ratio of controls of a control set to a rich side and a control set to a lean side "wherein a rich side control time: a lean side control time=5:2 to 4:3".

* * * * *